United States Patent
Loh

(10) Patent No.: US 10,255,190 B2
(45) Date of Patent: Apr. 9, 2019

(54) HYBRID CACHE

(71) Applicant: Advanced Micro Devices, Inc., Sunnyvale, CA (US)

(72) Inventor: Gabriel H. Loh, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 122 days.

(21) Appl. No.: 14/973,448

(22) Filed: Dec. 17, 2015

(65) Prior Publication Data
US 2017/0177492 A1      Jun. 22, 2017

(51) Int. Cl.
| G06F 12/08 | (2016.01) |
| G06F 17/40 | (2006.01) |
| G06F 12/0897 | (2016.01) |
| G06F 12/0895 | (2016.01) |
| G06F 12/0811 | (2016.01) |
| G06F 12/084 | (2016.01) |
| G06F 12/0842 | (2016.01) |
| G06F 12/0846 | (2016.01) |

(52) U.S. Cl.
CPC ........ G06F 12/0897 (2013.01); G06F 12/084 (2013.01); G06F 12/0811 (2013.01); G06F 12/0842 (2013.01); G06F 12/0846 (2013.01); G06F 12/0895 (2013.01); *G06F 2212/1016* (2013.01); *G06F 2212/1044* (2013.01); *G06F 2212/502* (2013.01); *G06F 2212/601* (2013.01); *G06F 2212/604* (2013.01)

(58) Field of Classification Search
CPC ............. G06F 12/0684; G06F 12/0808; G06F 12/0813; G06F 12/0824; G06F 12/0833
USPC ...................................................... 711/118
See application file for complete search history.

(56) References Cited

U.S. PATENT DOCUMENTS

| 6,868,485 | B1 | 3/2005 | Conway |
| 7,257,678 | B2 | 8/2007 | Golden et al. |
| 7,389,402 | B2 | 6/2008 | Zuraski, Jr. et al. |
| 8,788,783 | B1* | 7/2014 | Karnati ................ G06F 12/084 |
| | | | 711/118 |
| 9,251,081 | B2 | 2/2016 | Chang et al. |
| 9,710,383 | B1* | 7/2017 | Xu ...................... G06F 12/0246 |
| 2002/0156979 | A1 | 10/2002 | Rodriguez |
| 2004/0103251 | A1 | 5/2004 | Alsup |

(Continued)

OTHER PUBLICATIONS

International Search Report and Written Opinion in International Application No. PCT/US2016/052722, dated Jan. 12, 2017, 11 pages.

*Primary Examiner* — Mohamed M Gebril
(74) *Attorney, Agent, or Firm* — Meyertons Hood Kivlin Kowert and Goetzel PC; Rory D. Rankin

(57) ABSTRACT

Systems, apparatuses, and methods for implementing a hybrid cache. A processor may include a hybrid L2/L3 cache which allows the processor to dynamically adjust a size of the L2 cache and a size of the L3 cache. In some embodiments, the processor may be a multi-core processor and there may be a single cache partitioned into a logical L2 cache and a logical L3 cache for use by the cores. In one embodiment, the processor may track the cache hit rates of the logical L2 and L3 caches and adjust the sizes of the logical L2 and L3 cache based on the cache hit rates. In another embodiment, the processor may adjust the sizes of the logical L2 and L3 caches based on which application is currently being executed by the processor.

19 Claims, 15 Drawing Sheets

(56) References Cited

U.S. PATENT DOCUMENTS

| | | | |
|---|---|---|---|
| 2006/0248287 A1* | 11/2006 | Buyuktosunoglu | G06F 12/0833 711/146 |
| 2007/0143546 A1* | 6/2007 | Narad | G06F 12/084 711/130 |
| 2008/0104323 A1 | 5/2008 | Colglazier et al. | |
| 2008/0151881 A1* | 6/2008 | Liu | H04L 1/0002 370/389 |
| 2010/0030964 A1* | 2/2010 | Aciicmez | G06F 12/126 711/119 |
| 2011/0145506 A1* | 6/2011 | Cherukuri | G06F 12/084 711/130 |
| 2013/0185518 A1* | 7/2013 | Aronovich | G06F 12/0862 711/137 |
| 2014/0006716 A1* | 1/2014 | Steeley, Jr. | G06F 15/167 711/130 |
| 2015/0032962 A1* | 1/2015 | Buyuktosunoglu | G06F 12/0811 711/122 |
| 2015/0089150 A1* | 3/2015 | Kessler | G06F 12/1045 711/139 |
| 2015/0127912 A1 | 5/2015 | Solihin | |
| 2015/0205724 A1 | 7/2015 | Hancock et al. | |

* cited by examiner

| Control Unit 300 |
|---|
| Remapping Unit 305 |
| Table(s) 310 |

Table 310A

| Application | Preferred L2 Size | Preferred L3 Size |
|---|---|---|
| First | 128 KB | 896 KB |
| Second | 384 KB | 640 KB |
| Third | 256 KB | 768 KB |
| ... | ... | ... |

Table 310B

| Parameter | Current Value | Threshold | Exceeds Threshold? |
|---|---|---|---|
| First Cache Hit Rate | 36% | 50% | No |
| Second Cache Hit Rate | 62% | 70% | No |
| Difference Between First and Second Cache Hit Rates | 26% | 15% | Yes |
| Migration Rate | 18% | 35% | No |
| ... | ... | ... | ... |

HYBRID CACHE

BACKGROUND

Technical Field

Embodiments described herein relate to processors and more particularly, to utilizing caches in processors.

Description of the Related Art

Many modern computing devices (e.g., laptop/desktop computers, smart phones, set-top boxes, appliances, etc.) include processing subsystems with one or more caches. Caches are generally smaller, fast-access memory circuits located in or near the processing subsystem that can be used to store data that is retrieved from higher levels of a memory hierarchy in the computing device (i.e., other, larger caches and/or memories) to enable faster access to the stored data.

Generally, the main memory of a computer system has a memory organization at the page level of granularity. Typically, a page may be a four kilobyte (KB) page, although any other size page may be defined for a particular implementation. Cache memory organization is generally at a cacheline level of granularity. A cacheline is a set of bytes stored in contiguous memory locations, which are treated as a unit for coherency purposes. As used herein, each of the terms "cacheline" and "cache block" are interchangeable. The number of bytes in a cacheline may vary according to design choice, and may be of any size.

A multi-level cache hierarchy is often employed for modern processors. For example, for a multi-core processor, each core may include a level-one (L1) cache for storing data and/or instructions. The multi-level cache hierarchy would also typically include a private level-two (L2) cache per core and a larger level-three (L3) cache which is shared among the cores. The processor may execute many different types of applications which have different amounts of data to process and different data access patterns. Some applications may process large amounts of data while other applications may work with a small amount of data by progressively modifying the same portions of data. However, using the conventional multi-level cache hierarchy may result in some applications being executed by the processor at less than optimal efficiency.

SUMMARY

Systems, apparatuses, and methods for implementing a hybrid cache are contemplated.

In various embodiments, a multi-core processor may include a multi-level cache hierarchy. The processor may have a cache organization that effectively combines a first and second level of a cache hierarchy together into a single cache that is then logically partitioned for use by each of the cores. In various embodiments, the cache is logically partitioned into level two (L2) and level three (L3) caches, with each core being allocated a given logical L2 and L3 cache. In various embodiments, the sizes of the first and second levels of the cache hierarchy may be statically set or dynamically adjusted.

For example, the sizes of the logical caches may be fixed at the time of production. In other embodiments, the sizes of logical caches may be dynamically adjusted based on current operating conditions. For example, a processor may execute a first application that would benefit from a larger L3 cache at the expense of a smaller L2 cache. When executing the first application, the processor may reduce the size of the L2 cache(s) and increase the size of the L3 cache. Subsequently, the processor may switch from executing the first application to executing a second application and the processor may determine or receive an indication that the second application would benefit from a larger L2 cache at the expense of a smaller L3 cache. Accordingly, the processor may then reduce the size of the L3 cache and increase the size(s) of the L2 cache(s).

In further embodiments, the processor may monitor various parameters associated with the different levels of the cache hierarchy. In this embodiment, the processor may dynamically adjust the sizes of two or more levels of the cache hierarchy based on the monitored parameters. These parameters may include a cache hit rate of a first cache, a cache hit rate of a second cache, and a migration rate of cachelines between different first cache(s) corresponding to separate processor cores. In various embodiments, the processor may compare one or more of the parameters to one or more thresholds. Based on the result(s) of the comparison(s), the processor may reduce the size of the first cache (e.g., L2 cache) and increase the size of the second cache (e.g., L3 cache), the processor may increase the size of the first cache and decrease the size of the second cache, or the processor may maintain the current sizes of the first and second caches.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
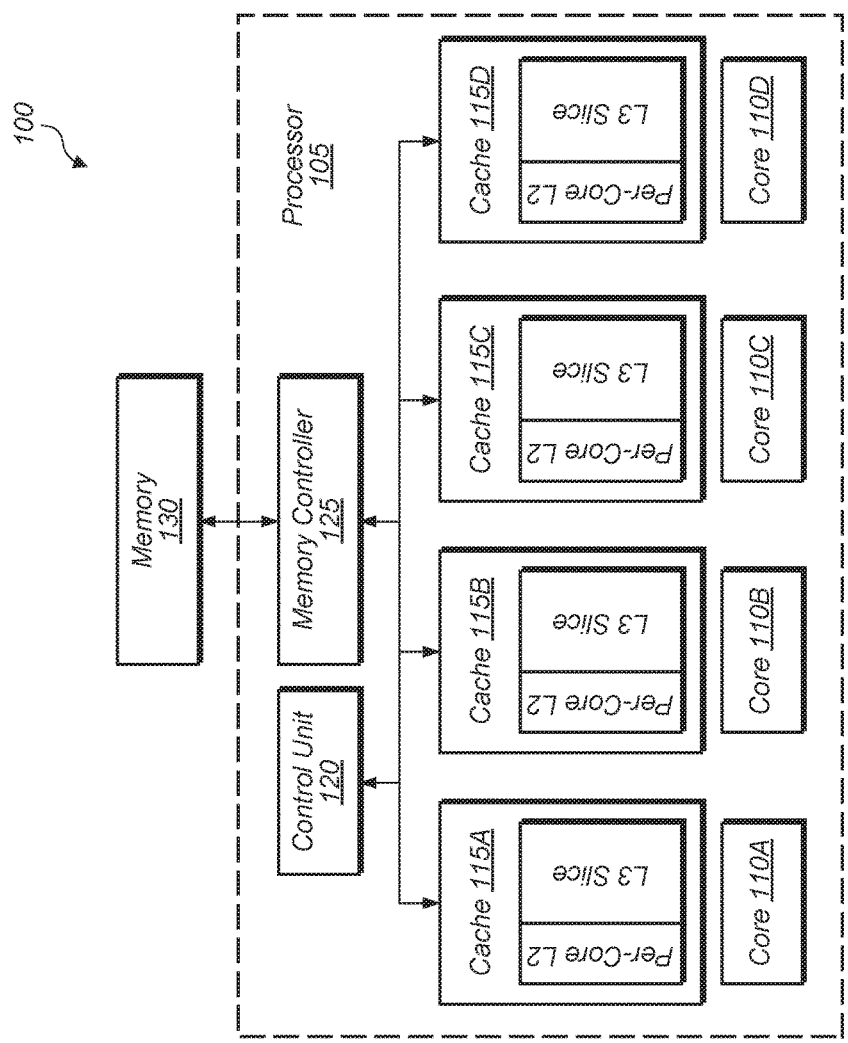
FIG. 1 is a block diagram of one embodiment of a computing system.

Referring now to FIG. 1, a block diagram illustrating one embodiment of a computing system 100 is shown. System 100 may include processor 105 and memory 130. System 100 may also include other components (e.g., display, input/output (I/O) interface, network interface) which are not shown in FIG. 1 to avoid obscuring the figure. Depending on the embodiment, system 100 may be any of various types of computing systems, including a mobile device (e.g., smartphone, tablet), computer, television, entertainment device, server, etc. Processor 105 is representative of any type (e.g., graphics processing unit (GPU), central processing unit (CPU), accelerated processing unit (APU)) of processor for executing instructions and performing computational operations.

In one embodiment, processor 105 may be a multi-core processor with four cores 110A-D as shown in FIG. 1 and caches 115A-D. In other embodiments, processor 105 may include other numbers of cores. In various embodiments, as will be discussed in greater detail below, each cache 115A-D may be a single physical cache that is partitioned into logical caches. Each core 110A-D may include a level-one (L1) cache (not shown) for storing instructions and/or data. Each core 110A-D may also include and/or be coupled to a corresponding physical cache 115A-D. Each of caches 115A-D may include memory circuits that are used for storing cached data and instructions. For example, caches 115A-D may include one or more of static random access memory (SRAM), embedded dynamic random access memory (eDRAM), DRAM, double data rate synchronous DRAM (DDR SDRAM), and/or other types of memory circuits.

In one embodiment, each cache 115A-D may include a configurable level-two (L2) cache logically combined with a configurable slice (or portion) of a shared level-three (L3) cache, with processor 105 being able to modify the sizes of these cache portions. If processor 105 reduces the size of the L2 portion of a particular cache 115A-D by a given amount, processor 105 may increase the size of the L3 portion of the particular cache 115A-D by the given amount. Or, if processor 105 increases the size of the L2 portion of a particular cache 115A-D by a given amount, processor may reduce the size of the L3 portion of the particular cache 115A-D by the given amount. In other words, each cache 115A-D has a fixed storage capacity which is split between the L2 cache and the L3 slice. Accordingly, any change to the size of the L2 cache of a given cache 115A-D will cause an opposite change to the size of the L3 slice of the given cache 115A-D.

While the example of dynamically resizing L2 and L3 caches is illustrated and described in regard to FIG. 1, this is meant to be a non-limiting example, and it should be understood that a processor may dynamically resize any two or more adjacent levels of the cache hierarchy. Similarly, throughout this disclosure, when the example of dynamically resizing L2 and L3 cache portions is described, it should be understood that these techniques may be utilized with other levels of the cache hierarchy. In some embodiments, the sizes of three or more levels of the cache hierarchy may be dynamically adjusted using the techniques described herein.

In one embodiment, processor 105 may dynamically change the sizes of the L2 and L3 portions of each cache 115A-D. Accordingly, in this embodiment, the storage capacity of the L2 and L3 caches may be changed at run time. In one embodiment, the configuration of the L2 and L3 caches may be modified by software (e.g., operating system, hypervisor, applications). In another embodiment, a hardware controller (e.g., control unit 120) may monitor system performance metrics (e.g., L2 and L3 cache hit rates) and dynamically resize the L2 and L3 allocations to optimize some objective (e.g., maximizing performance). In a further embodiment, the configuration of the L2 and L3 caches may be set by a combination of software and hardware.

In various embodiments, processor 105 may dynamically change the sizes of the L2 and L3 portions of each cache 115A-D in response to detecting one or more conditions. The one or more conditions may depend on monitored parameters associated with the L2 and L3 caches and/or changes in the applications being executed by processor 105. Processor 105 may be configured to monitor the hit rates of the L2 and L3 caches, the migration rate of cache lines between different L2 caches among the different cores, and/or other parameters associated with the L2 and L3 caches. Processor 105 may compare these parameters to one or more thresholds to determine whether or not to dynamically reallocate storage capacity between the L2 and L3 portions of caches 115A-D.

In another embodiment, processor 105 may monitor applications which are being executed and determine the best allotment of L2 and L3 cache sizes for each application being executed. In some cases, processor 105 may maintain historical behavior data associated with the applications to determine which distribution of cache sizes will allow the applications to run more efficiently. In other cases, each application may have a predetermined setting which indicates the preferred or optimal cache sizes for the application. For example, a first application may include a setting that indicates the first application would benefit from relatively small L2 caches and a relatively large L3 cache. Therefore, when executing the first application, processor 105 may reduce the size of each core's L2 cache and increase the size of the L3 slices. Then, at a later point in time, the processor may execute a second application which includes a setting that indicates the second application would benefit from relatively large L2 caches and a relatively small L3 cache. Therefore, the processor may increase each core's L2 cache and decrease the size of their L3 slices in response to executing the second application.

In another embodiment, the sizes of L2 and L3 caches of caches 115A-D may be statically adjusted as part of the fabrication or manufacturing process of processor 105. In this embodiment, the L2 and L3 cache configuration may be set at manufacturing time. This allows the same silicon design to be deployed as a variety of different configurations. In this embodiment, one system on chip (SoC) may be utilized with multiple stock keeping units (SKUs). For example, configuration fuses may be used to set the desired configuration of the L2 and L3 caches of caches 115A-D. Alternatively, the sizes of the L2 and L3 caches of caches 115A-D may be stored in configuration bits of a read-only memory (ROM) that the BIOS reads during bootup, which will cause the cache sizes to be set during system startup.

In one embodiment, control unit 120 may be configured to determine how much of each cache 115A-D is allocated for the variable-sized L2 cache and how much of each cache 115A-D is allocated for the variable-sized L3 Slice. Although control unit 120 and memory controller 125 are shown as being connected to caches 115A-D via the same bus, this is shown merely for ease of illustration, and it should be understood that control unit 120 and memory controller 125 may utilize different physical connections for connecting to caches 115A-D.

Memory 130 comprises memory circuits that form a "main memory" of computing system 100. Memory 130 may be used for storing instructions and data for use by the cores 110A-D of processor 105. Memory 130 is representative of any number, capacity, and type of memory devices. Various types of memory 130 may be utilized in system 100, including random-access memory (RAM), static RAM (SRAM), dynamic RAM (DRAM), high-speed CMOS, high-density DRAM, eDRAM, 3D stacked memory (e.g., stacked DRAM), interposer-based integrated memory, multi-chip modules (MCM), off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc.

Figure 2:
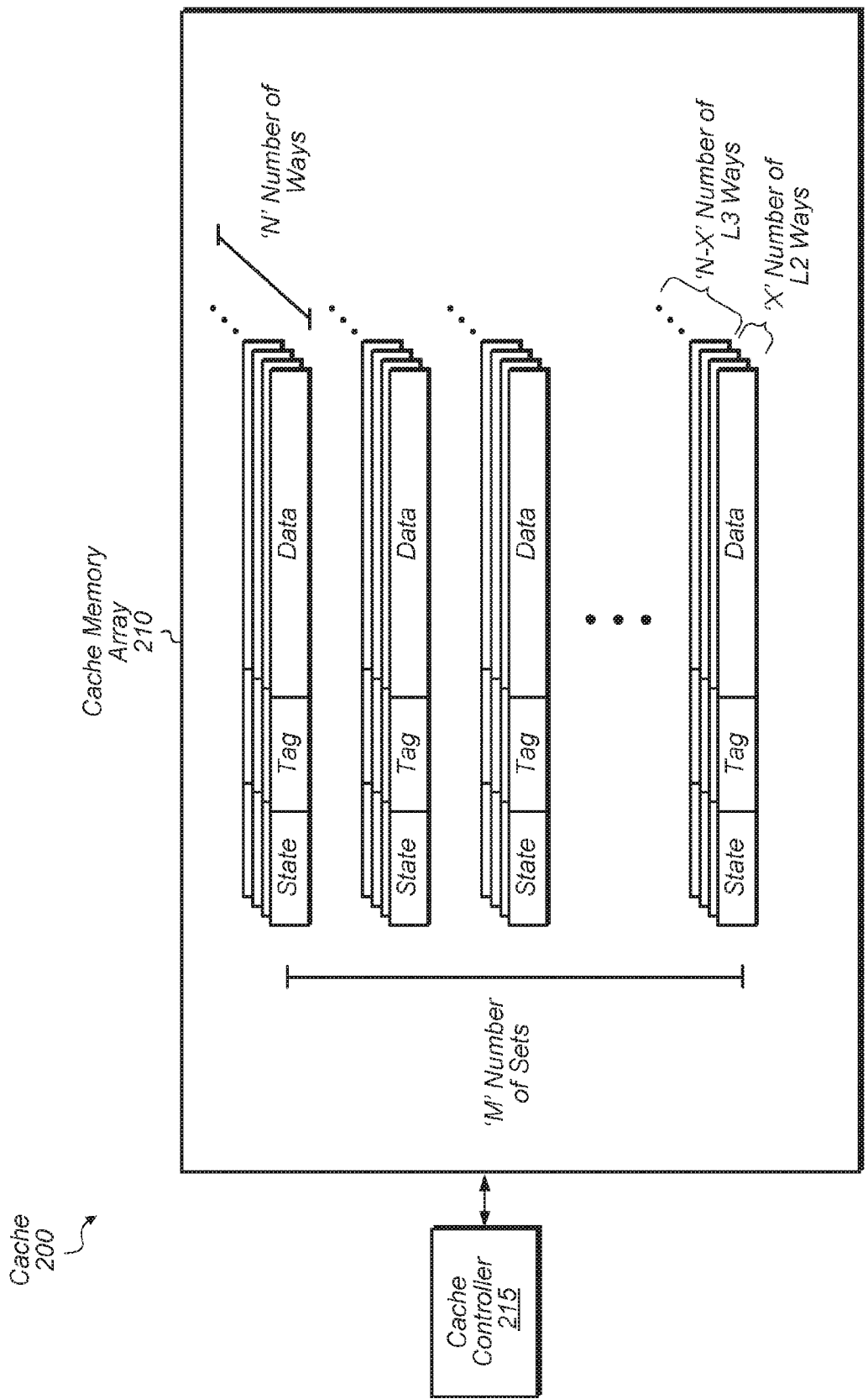
FIG. 2 is a block diagram of one embodiment of a logical cache.

Turning now to FIG. 2, a block diagram of one embodiment of a cache 200 is shown. In one embodiment, each of the caches 115A-D (of FIG. 1) may include the components of cache 200. In other embodiments, other types and/or structures of logical caches may be utilized. As shown in FIG. 2, cache 200 has an associated cache controller 215 and cache memory array 210. In one embodiment, cache memory array 210 may be organized as a set associative cache. Cache memory array 210 may include a plurality of 'M' sets, with 'M' varying from embodiment to embodiment. Each set may include 'N' number of ways, with 'N' also varying from embodiment to embodiment, wherein 'M' and 'N' are positive integers.

In one embodiment, 'X' number of ways of each set may be allocated to the L2 portion of cache 200, and 'N-X' number of ways of each set may be allocated to the L3 portion of cache 200. Accordingly, when a lookup is performed of the L2 portion, cache controller 215 may look in only the 'X' number of ways of the corresponding set for the targeted address. If the lookup is a miss, a lookup of 'N-X' ways of the L3 cache may be performed. The lookup of the L3 cache for a given core may be performed to either the same logical cache or to a different logical cache depending on the address interleaving scheme and the address targeted by the memory request.

Cache controller 215 may perform various functions for controlling operations in cache 200. For example, cache controller 215 may store, invalidate, and/or evict cachelines, perform lookups for cachelines, handle coherency operations, and respond to requests for cachelines from cache 200. Cache controller 215 may also be configured to reassign capacity between the L2 and L3 portions of cache 200. For example, in one embodiment, cache controller 215 may be coupled to a control unit (e.g., control unit 120 of FIG. 1) for receiving updates indicating how cache 200 should be partitioned into L2 and L3 portions. In response to receiving an update from a control unit, cache controller 215 may be configured to dynamically readjust the sizes of the L2 and L3 portions of cache 200.

Figure 3:
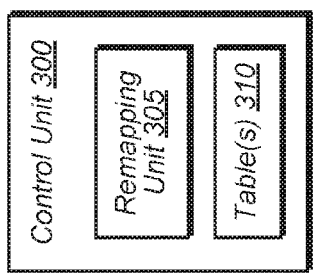
FIG. 3 is a block diagram of one embodiment of a control unit.

Referring now to FIG. 3, one embodiment of a control unit 300 is shown. In one embodiment, control unit 120 of FIG. 1 may include the components of control unit 300. Control unit 300 may include at least remapping unit 305 and table(s) 310. Remapping unit 305 may be configured to remap data in a logical cache (e.g., cache 200 of FIG. 2) after the logical cache has been resized between the L2 and L3 portions. When a way or other portion is reallocated from the L2 to the L3 portion of the logical cache, or from the L3 to the L2 portion of the logical cache, the data stored in the way may no longer be mapped to the correct location. Accordingly, remapping unit 305 may be configured to remap and migrate data after the L2 and L3 configuration has changed. Alternatively, instead of migrating data, the control unit 300 may invalidate the data after the L2 and L3 configuration has changed.

Control unit 300 may also be configured to monitor various parameters associated with the processor, applications, and caches. In one embodiment, control unit 300 may store parameter values in one or more of table(s) 310. Table(s) 310 are representative of any number and type of structure(s) which may be utilized for storing data associated with the operating conditions of the host processor. For example, in one embodiment, control unit 300 may store preferred L2 and L3 cache sizes in table 310A for a plurality of applications which are being executed by the host processor. Alternatively, in some embodiments, instead of utilizing table 310A, control unit 300 may retrieve or receive a setting from software for the current application being executed. Control unit 300 may then utilize the setting to determine whether to adjust or maintain the current assignment of capacity between the L2 and L3 caches.

Table 310A is an example of a table which may be utilized by control unit 300 to determine the preferred L2 and L3 cache sizes for a given application being executed by the host processor. Any number of settings for any number of applications may be stored in table 310A. As shown in table 310A, a first application may have a preferred L2 cache size of 128 KB and a preferred L3 slice size of 896 KB for the per-core logical cache, a second application may have a preferred L2 cache size of 384 KB and a preferred L3 slice size of 640 KB for the per-core logical cache, a third application may have a preferred L2 cache size of 256 KB and a preferred L3 slice size of 768 KB for the per-core logical cache, and so on. It may be assumed for the purposes of this discussion that 1 MB is the total per-core logical cache size for the L2 and L3 portions. The amount of storage capacity for the per-core logical cache size may vary according to the embodiment.

Table 310B is another example of a table which may be utilized by control unit 300 to determine when to adjust the L2 and L3 cache sizes for each per-core logical cache. Table 310B may include the current values of parameters associated with the L2 and L3 caches which may be utilized for comparisons with one or more thresholds. In one embodiment, software and/or other control logic may be configured to program the threshold values stored in table 310B. In another embodiment, the threshold values stored in table 310B may be predetermined. It is noted that control unit 300 may include other tables (e.g., remapping table) which may be utilized to assist in dynamically resizing the L2 and L3 cache portions or to relocate data after resizing.

Figure 4:
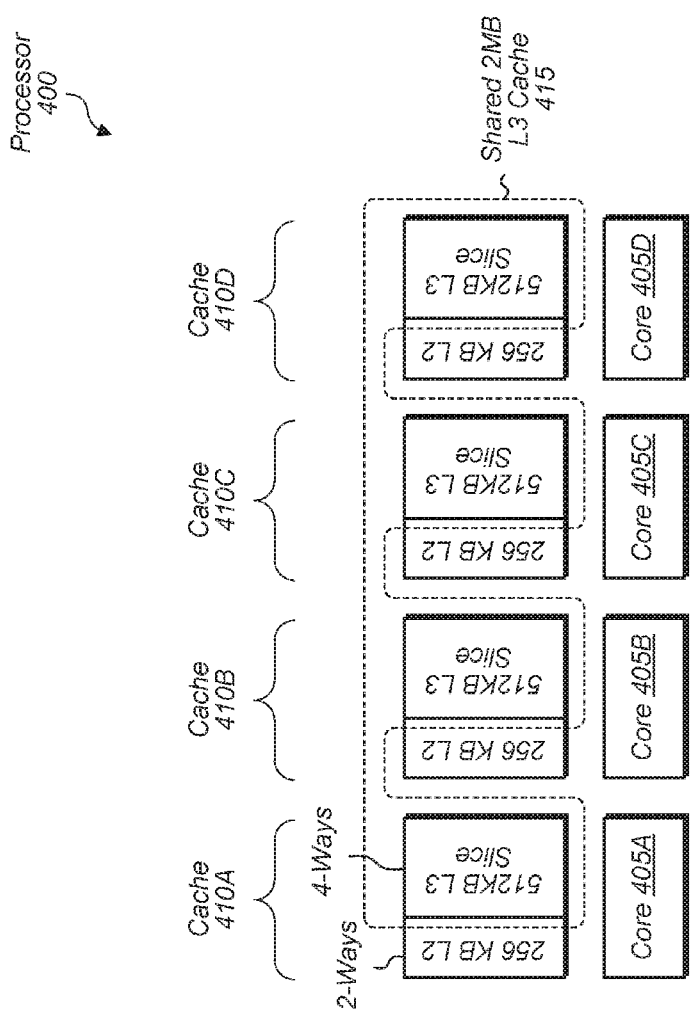
FIG. 4 is a block diagram of one embodiment of a processor.

Turning now to FIG. 4, one embodiment of a processor 400 is shown. Processor 400 may include cores 405A-D and caches 410A-D. In other embodiments, processor 405 may include other numbers of cores and corresponding caches. Each cache 410A-D may include a L2 cache and a L3 slice, with the L2 cache and L3 slice adjustable in size. The total size of each cache 410A-D may be fixed, such that an increase in the size of the L2 portion will be offset by a reduction in the size of the L3 portion. The size mix between the L2 and L3 portions for a given cache 410A-D may be adjusted such that processor performance is optimized for the current operating conditions and/or current application(s) being executed by processor 400.

The assignment of resources of caches 410A-D as shown in FIG. 4 illustrates one example of how space may be allocated between the L2 and L3 portions of caches 410A-D. As shown in FIG. 4, two ways of cache 410A are allocated to the L2 cache and four ways of cache 410A are allocated to the L3 cache. It may be assumed for the purposes of this discussion that there are six ways of cache 410A, and it may also be assumed that the capacity of cache 410A allocated to the L2 cache is 256 kilobytes (KB) and the capacity of cache 410A allocated to the L3 cache is 512 KB. The assignment of L2 and L3 portions shown for cache 410A may also be used for caches 410B-D. However, it should be understood that the allotments of capacity to the L2 and L3 portions does not have to be the same for each of caches 410A-D.

L3 cache 415 may be a shared cache among cores 405A-D, and the total capacity allocated for L3 cache 415 is 2 megabytes (MB) when all four L3 slices are added together. Processor 400 may utilize address interleaving such that a request for a given core 405A-D may be mapped to a L3 slice of a different cache 410A-D than the cache 410A-D corresponding to the given core 405A-D. For example, addresses for memory requests generated by core 405A may be mapped to L3 portions of cache 410A, cache 410B, cache 410C, and cache 410D. The other cores may also be mapped to all of the caches 410A-D with a similar address interleaving scheme.

While it is illustrated in FIG. 4 that caches 410A-D may have a first portion of ways allocated to the L2 cache and a second portion of ways allocated to the L3 cache, it should be understood that this is merely one example of a scheme for dividing caches. In other embodiments, caches 410A-D may be divided into portions of other dimensions (e.g., sets, banks) between the L2 and L3 portions. For example, in another embodiment, a first number of sets may be allocated to the L2 cache and a second number of sets may be allocated to the L3 cache for each cache 410A-D.

Figure 5:
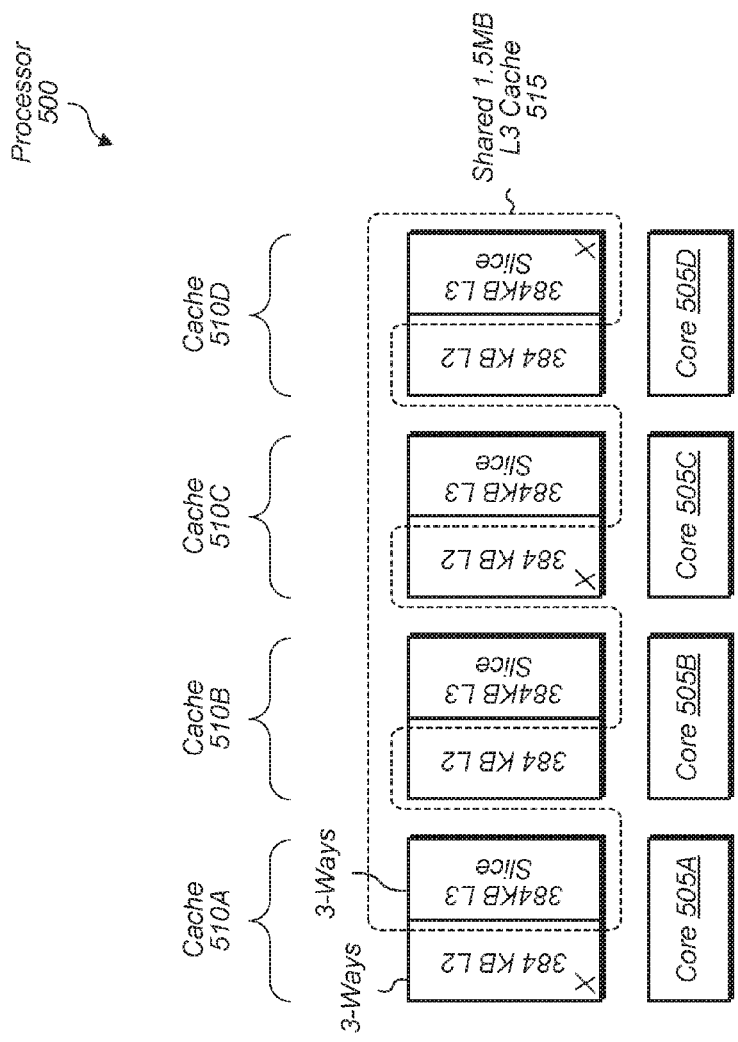
FIG. 5 is a block diagram of another embodiment of a processor.

Referring now to FIG. 5, a block diagram of another embodiment of a processor 500 is shown. Processor 500 may include cores 505A-D and caches 510A-D. In other embodiments, processor 505 may include other numbers of cores. Each cache 510A-D may include a L2 portion and a L3 portion, with the L2 and L3 portions adjustable in size. Processor 500 may be configured to dynamically adjust the L2 and L3 portions of each cache 510A-D.

One example of a cache implementation is shown in FIG. 5, with three ways allocated to the L2 cache and three ways allocated to the L3 slice for each cache 510A-D. In one embodiment, processor 500 may represent processor 400 at a later point in time after the sizes of the L2 caches and L3 cache have been adjusted. In this embodiment, the L3 slices have been reduced from four ways of each cache 510A-D to three ways of each cache 510A-D. Processor 500 may adjust the size of L3 cache 515 and the L2 caches in response to detecting one or more conditions. Examples of conditions for adjusting cache sizes are described in further detail below in the discussion associated with FIGS. 8-13.

In the embodiment shown in FIG. 5, it may be assumed that each way corresponds to 128 KB of data for each cache 510A-D. Accordingly, each L2 cache of the caches 510A-D includes a capacity of 384 KB, while each L3 slice of the caches 510A-D also includes a capacity of 384 KB. The total capacity of the shared L3 cache 515 is 1.5 MB in this embodiment. Other embodiments may have different numbers of ways per cache 510A-D and/or other amounts of capacity per way.

In one embodiment, core 505A may cache a copy of cacheline 'X' in its L2 cache. Core 505C may also cache a copy of cacheline 'X' in its respective L2 cache. However, it may be assumed for the purposes of this discussion that core 505B does not have a copy of cacheline 'X' in its L2 cache. On a cache miss in the L2 slice of cache slice 510B, core 505B may send a request to core 505D, assuming that the L3 address interleaving maps cacheline 'X' to the L3 slice of core 505D. Accordingly, a lookup can be performed to find cacheline 'X' in the L3 slice of core 505D, which will then be provided to core 505B.

Figure 6:
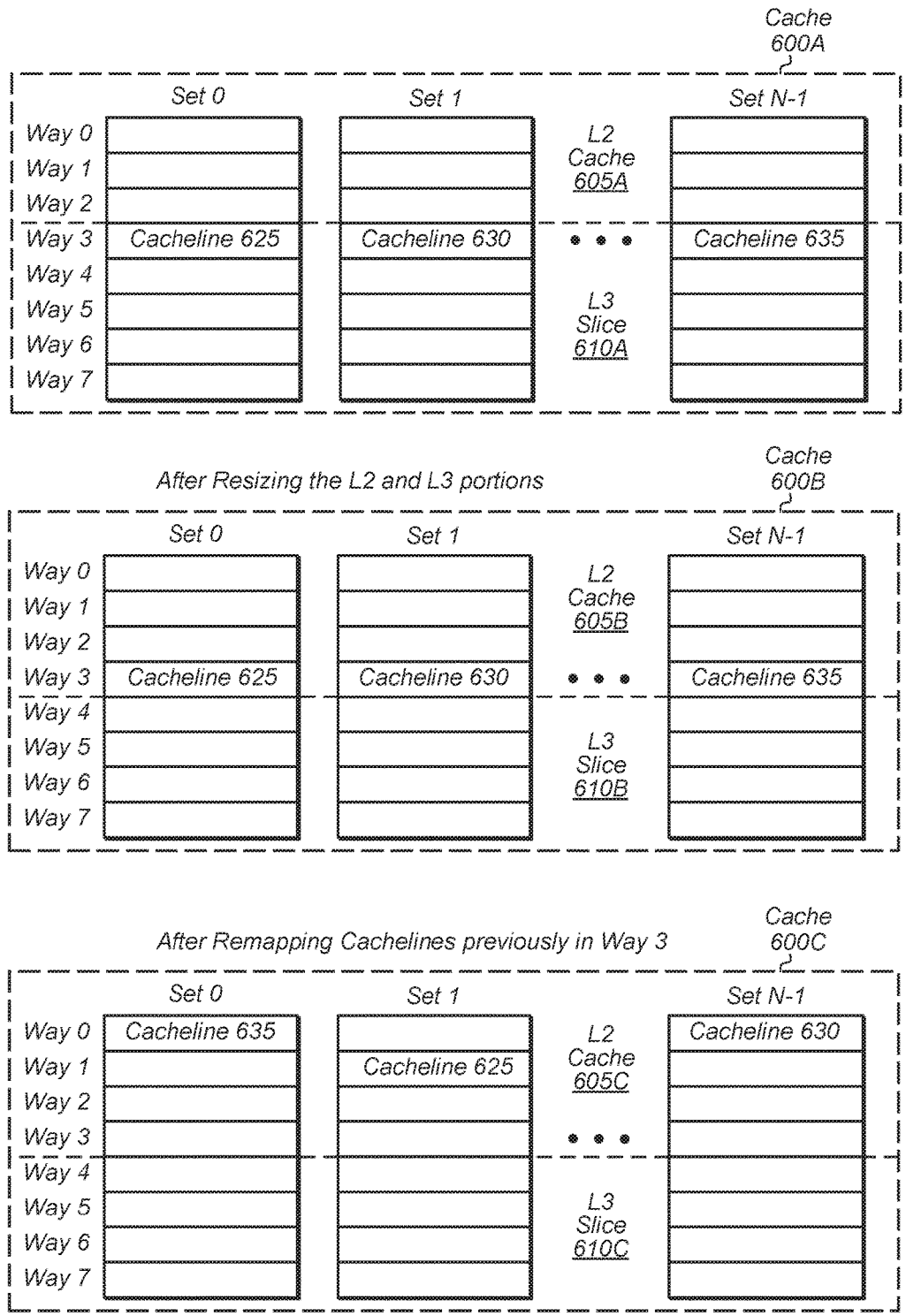
FIG. 6 is a block diagram of one embodiment of a logical cache at three different points in time.

Turning now to FIG. 6, a block diagram of one embodiment of a cache 600 at three different points in time is shown. Cache 600A is shown at the top of FIG. 6, and cache 600A includes L2 cache 605A and L3 slice 610A. L3 slice 610A may be part of a larger L3 cache which includes L3 slices of other caches (not shown) corresponding to other cores. Cache 600A may be configured to dynamically adjust the sizes of L2 cache 605A and L3 slice 610A in response to changing operating conditions. As shown in cache 600A, L2 cache 605A includes ways 0-2 and L3 slice 610A includes ways 3-7. In other embodiments, cache 600A may include other numbers of ways. Cache 600A may also include 'N' sets, wherein 'N' is a positive integer which may vary from embodiment to embodiment. Cacheline 625 is shown as being stored in way 3 of set 0 of cache 600A, cacheline 630 is shown as being stored in way 3 of set 1 of cache 600A, and cacheline 635 is shown as being stored in way 3 of set N of cache 600A. It is noted that cache 600A may store other cachelines which are not shown to avoid obscuring the figure.

It may be assumed for the purposes of this discussion that the capacity of cache 600A is dynamically reallocated between L2 and L3 portions in response to detecting one or more conditions, receiving a command from software, and/or other event(s). The illustration of cache 600B in the middle of FIG. 6 is intended to represent cache 600A at a later point in time after the L2 and L3 portions have been resized. As shown in cache 600B, way 3 has been reallocated from L3 slice 610B to L2 cache 605B. Cachelines 625, 630, and 635 may remain in their same physical locations in way 3, but they are now stored in L2 cache 605B rather than L3 slice 610B. However, cachelines 625, 630, and 635 may not map to these locations in L2 cache 605B which would prevent the cache controller (not shown) from finding these cachelines when a lookup is performed of L2 cache 605B.

Accordingly, in response to the dynamic resizing of L2 cache 605B and L3 slice 610B, the cache controller may be configured to remap and migrate the cachelines which have been affected by the resizing to locations where they would actually map based on the appropriate bits of their addresses. The illustration of cache 600C (including L2 cache 605C and L3 slice 610C) at the bottom of FIG. 6 is intended to represent cache 600B at a later point in time after cachelines 625, 630, and 635 have been remapped to appropriate locations based on their address bits which correspond to the L2 mapping. It may be assumed for the purposes of this discussion that cacheline 625 has been remapped and migrated to way 1 of set 1 of L2 cache 605C, cacheline 630 has been remapped and migrated to way 0 of set N−1 of L2 cache 605C, and cacheline 635 has been remapped and migrated to way 0 of set 0 of L2 cache 605C. Alternatively, rather than remapping and migrating cachelines 625, 630, and 635, these cachelines may be invalidated. If and when these cachelines are requested again in the future, there will be a cache miss, and then the cachelines will be inserted into the L2 cache at the appropriate locations based on the address bits and the L2 mapping.

These re-mappings are merely intended to illustrate one example of a remapping scheme, with remapping schemes varying depending on the tag bits of the affected cachelines and the cache mapping schemes. It should be understood that the organization of cache 600 is intended to illustrate one possible organization of a cache. In other embodiments, other structures of caches may be implemented, with other numbers of sets, ways, and/or other cache dimensions.

Figure 7:
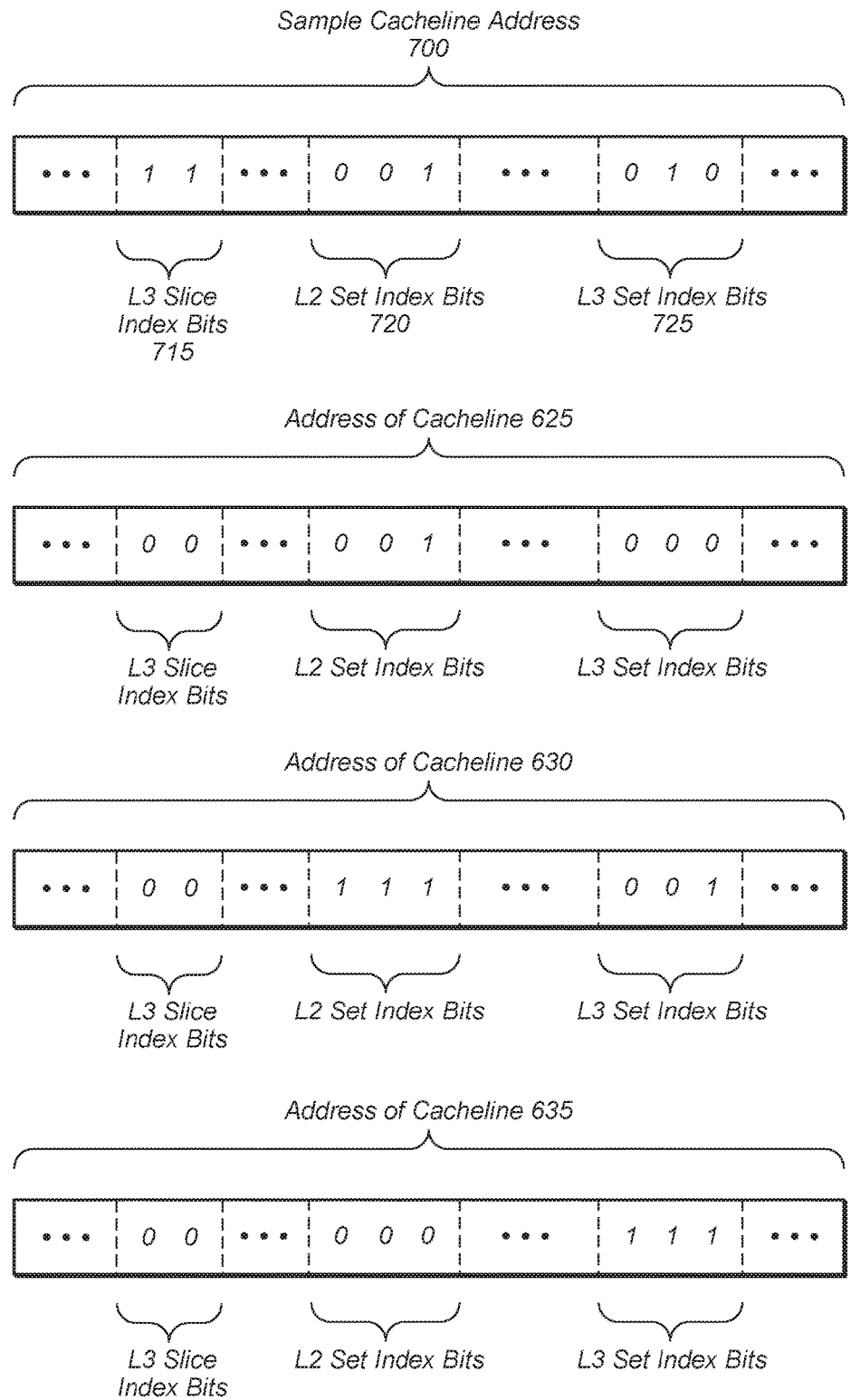
FIG. 7 illustrates diagrams showing the tag bits of multiple cachelines.

Referring now to FIG. 7, diagrams illustrating address bits of multiple cachelines are shown. A sample cacheline address 700 is shown at the top of FIG. 7, with sample cacheline 700 including any number of bits depending on the embodiment. A first portion of bits 715 of address 700 may be used for selecting a given slice (e.g., L3 slice 610A of FIG. 6) of the L3 cache, a second portion of bits 720 of address 700 may be used for selecting a given set of the L2 cache (e.g., L2 cache 605A of FIG. 6), and a third portion of bits 725 of address 700 may be used as the L3 tag bits for selecting a given set of the L3 slice (e.g., L3 slice 610A). Although it is shown that the L3 slice index bits 715 include two bits and the L2 set index bits 720 and L3 set index bits 725 include three bits, this is merely representative of one embodiment, and other embodiments may have other numbers of L3 slice index bits and L2 and L3 set index bits. In various embodiments, the L2 index bits, L3 slice bits, and L3 index bits may be separate from one another. Alternatively, in various embodiments one or more bits of the L2 index, L3 slice, and L3 index may overlap.

The address bits of cachelines 625, 630, and 635 are shown at the bottom of FIG. 7. It may be assumed for the purposes of this discussion that the L3 slice index bits '00' of cachelines 625, 630, and 635 are utilized to map cachelines 625, 630, and 635, respectively, to L3 slice 610A as shown in cache 600A. It may also be assumed for the purposes of this discussion that the L3 set index bits of cachelines 625, 630, and 635 are utilized to map cachelines 625, 630, and 635, respectively, to the correct sets of L3 slice 610A as shown in cache 600A. Accordingly, the L3 set index portion of the address of cacheline 625 is "000", which maps cacheline 625 to set 0 of L3 slice 610A, the L3 set index portion of the address of cacheline 630 is "001", which maps cacheline 630 to set 1 of L3 slice 610A, and the L3 set index portion of the address of cacheline 635 is "111", which maps cacheline 635 to set N−1 of L3 slice 610A. It may be assumed that 'N' is equal to eight in this particular embodiment. Then, after way 3 is reallocated from L3 slice 610A to L2 cache 605B, the L2 set index portions of the address of cachelines 625, 630, and 635 may be utilized to remap and migrate cachelines 625, 630, and 635, respectively, to the correct sets of L2 cache 605C as shown in cache 600C. Accordingly, the L2 set index portion of the address of cacheline 625 is "001", which maps cacheline 625 to set 1 of L2 cache 605C, the L2 set index portion of the address of cacheline 630 is "111", which maps cacheline 630 to set N−1 of L2 cache 605C, and the L2 set index portion of the address of cacheline 635 is "000", which maps cacheline 635 to set 0 of L2 cache 605C.

It should be understood that the examples of the specific address bits used to determine the cache slice and set mappings as shown in FIG. 7 are merely one possible implementation. Other implementations may utilize other address bits to determine the mapping of cachelines to locations within L2 caches and L3 slices of corresponding caches.

Figure 8:
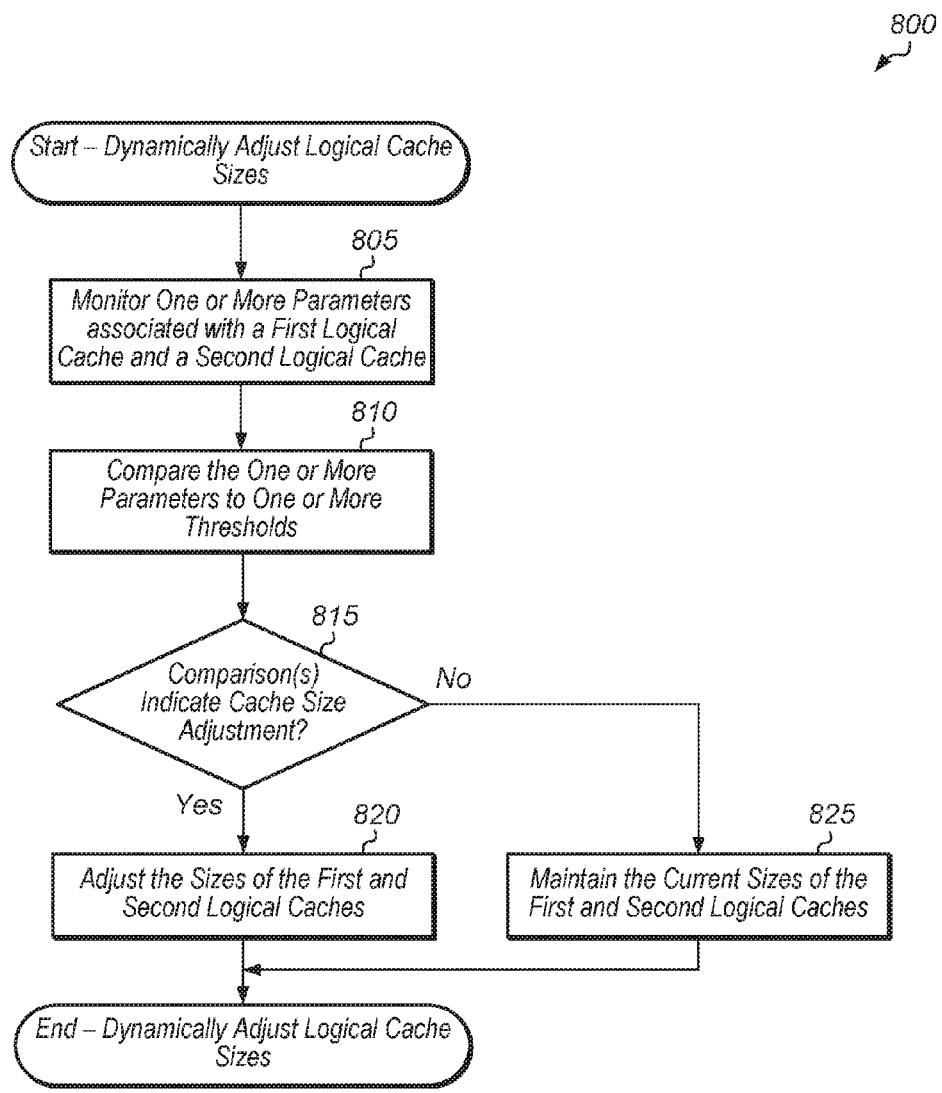
FIG. 8 is a generalized flow diagram illustrating one embodiment of a method for dynamically adjusting cache sizes.

Turning now to FIG. 8, one embodiment of a method 800 for dynamically adjusting logical cache sizes is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 800.

A processor may monitor one or more parameters associated with a first logical cache and a second logical cache (block 805). In one embodiment, a single cache may be logically partitioned into a first logical cache and a second logical cache, with the first logical cache representing a L2 cache and the second logical cache representing a L3 cache. In other embodiments, the first and second logical caches may represent other levels of a processor's cache hierarchy. The one or more parameters may include a cache hit rate of the first logical cache and/or second logical cache, a cache miss rate of the first logical cache and/or second logical cache, the migration rate of cachelines between different first logical caches, and/or other parameters.

Next, the processor may compare the one or more parameters to one or more thresholds (block 810). For example, in various embodiments, the processor may compare the cache hit rate of the first logical cache to a first threshold, the processor may compare the cache hit rate of the second logical cache to a second threshold, the processor may compare the difference between the first logical cache's hit rate and the second logical cache's hit rate to a third threshold, the processor may compare the migration rate to a fourth threshold, and/or the processor may perform other comparisons. The amount of time over which the cache hit rate or cacheline migration rate is calculated may vary according to the embodiment. In one embodiment, the comparisons may be ranked in order of importance in some embodiments, so that if the highest ranked comparison results in a given threshold being exceeded, then this would supersede all other comparisons. In another embodiment, the comparisons may be treated equally so that the result of one comparison cancels out the result of another comparison. In general, embodiments may utilize any function that considers one or more of the comparisons individually or in combination (for example, when both a first and second comparison exceed respective first and second given thresholds).

Next, the processor may determine if the comparison(s) indicate the sizes of the first and second logical caches should be adjusted (conditional block 815). For example, a comparison may indicate the size of the first logical cache should be reduced and the size of the second logical cache should be increased to achieve improved processor performance. Alternatively, the comparison(s) may indicate the size of the first logical cache should be increased and the size of the second logical cache should be reduced to achieve improved processor performance.

If the comparison(s) indicate the sizes of the first and second logical caches should be adjusted (conditional block 815, "yes" leg), then the processor may dynamically adjust the sizes of the first and second logical caches (block 820). If the comparison(s) do not indicate the sizes of the first and second logical caches should be adjusted (conditional block 815, "no" leg), then the processor may maintain the current sizes of the first and second logical caches (block 825). After blocks 820 and 825, method 800 may end. It is noted that method 800 may be performed on regular intervals. FIGS. 9-12 below provide further details on embodiments where specific parameters are monitored and compared to one or more thresholds.

Figure 9:
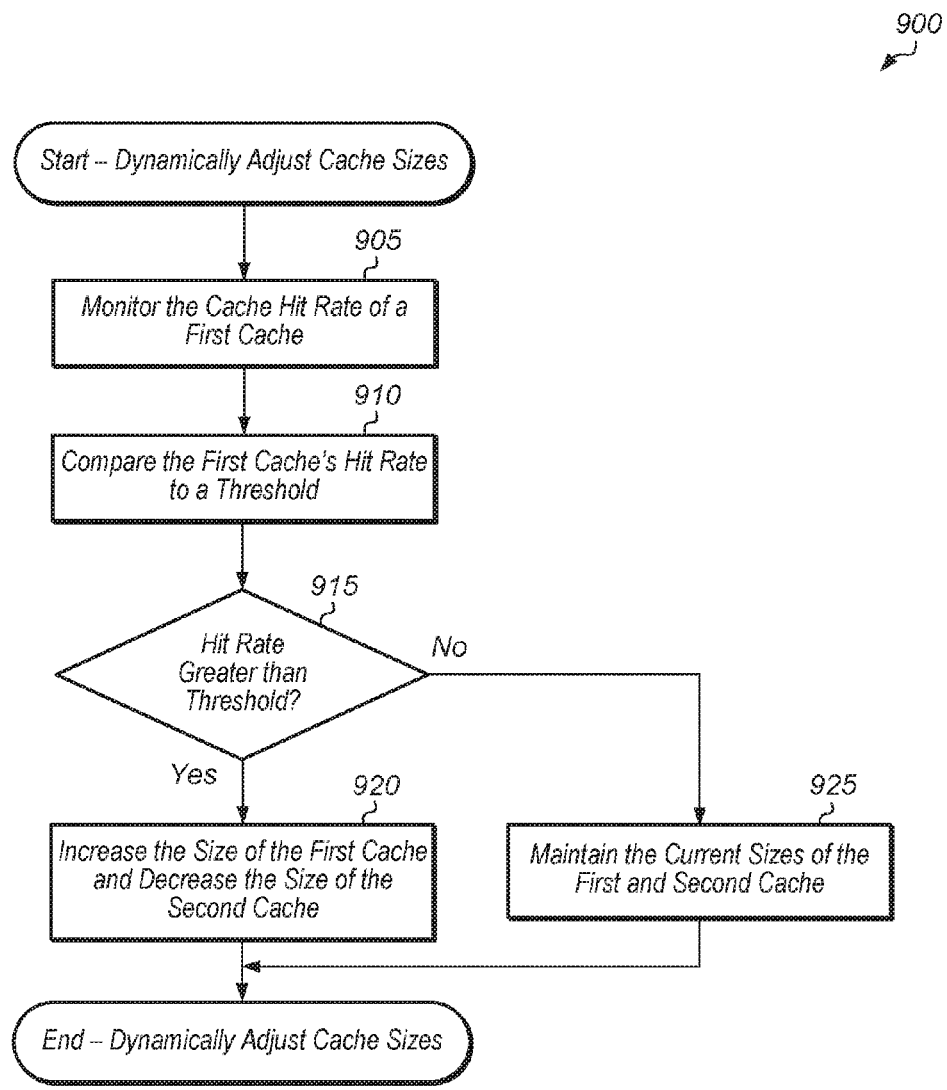
FIG. 9 is a generalized flow diagram illustrating another embodiment of a method for dynamically adjusting cache sizes.

Referring now to FIG. 9, another embodiment of a method 900 for dynamically adjusting cache sizes is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 900.

A processor may monitor the cache hit rate of a first cache (block 905). Alternatively, in block 905, the processor may monitor the cache miss rate of the first cache, which is equal to 1—the cache hit rate. In one embodiment, the processor may be a multi-core processor, with the number of cores varying from embodiment to embodiment. In various embodiments, a single cache is logically partitioned into a first (logical) cache and a second (logical) cache. In one embodiment, the first cache may be a L2 cache, and the second cache may be a L3 cache. Next, the processor may compare the first cache's hit rate to a threshold (block 910). In one embodiment, the threshold may be programmable.

If the first cache's hit rate is greater than the threshold (conditional block 915, "yes" leg), then the processor may increase the size of the first cache and decrease the size of the second cache (block 920). If the first cache's hit rate is less than the threshold (conditional block 915, "no" leg), then the processor may maintain the current sizes of the first cache and the second cache (block 925). After blocks 920 and 925, method 900 may end. In one embodiment, method 900 may be repeated on regular intervals to determine if the cache sizes should be adjusted based on the hit rate of the first cache. It is noted that method 900 may be performed by the processor concurrently with one or more other methods (e.g., methods 1000, 1100, and 1200 of FIGS. 10-12). In general, embodiments may utilize any function that considers one or more of the comparisons individually or in combination (for example, when both a first and second comparison exceed respective first and second given thresholds).

Figure 10:
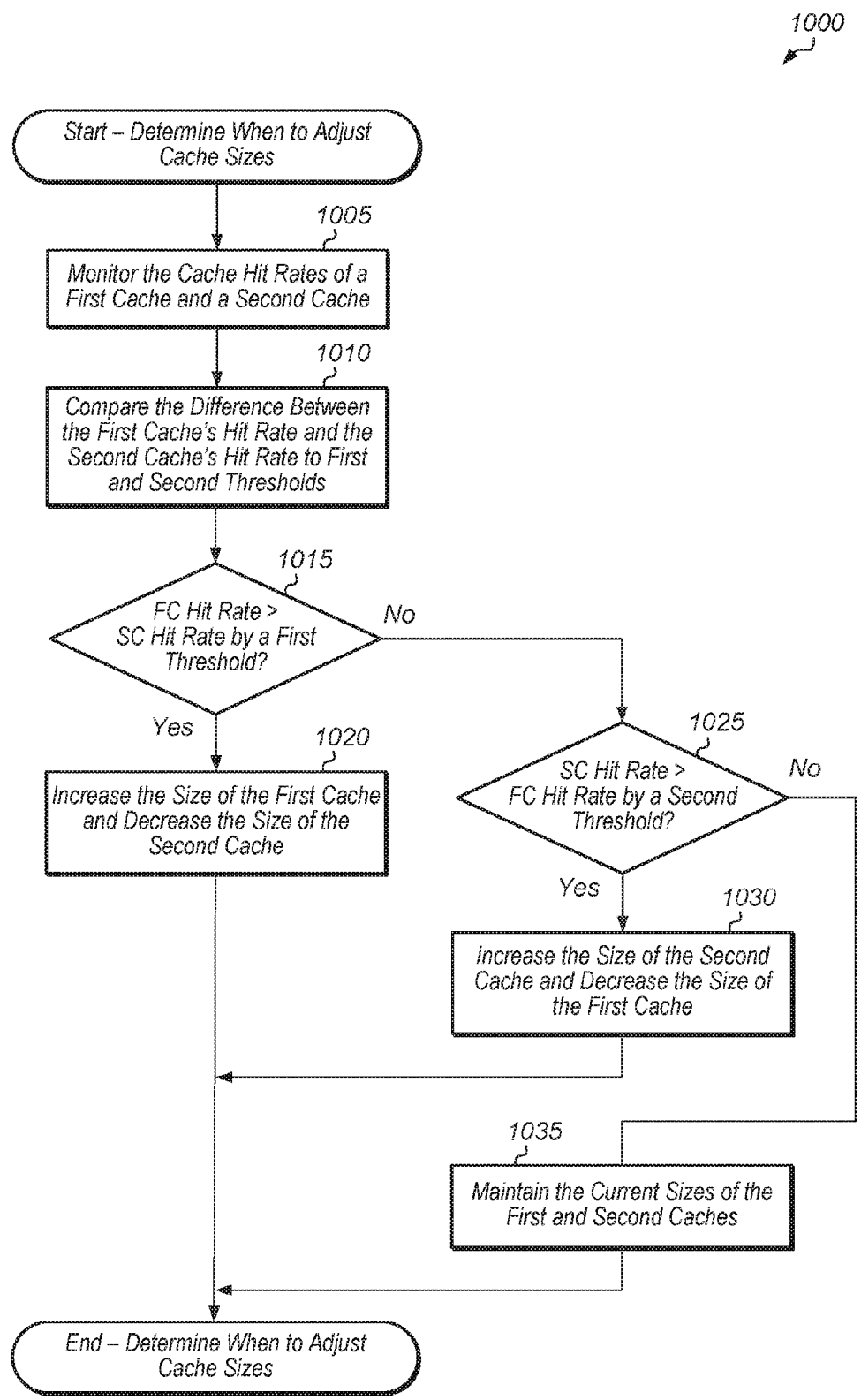
FIG. 10 is a generalized flow diagram illustrating one embodiment of a method for determining when to adjust cache sizes.

Referring now to FIG. 10, one embodiment of a method 1000 for determining when to adjust cache sizes is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 1000.

A processor may monitor the hit rates of a first cache and a second cache (block 1005). It may be assumed for the purposes of this discussion that the first (logical) cache is combined with the second (logical) cache in a single physical cache. In one embodiment, the first cache may be a L2 cache, and the second cache may be a L3 cache. In other embodiments, the first and second caches may be other cache levels of a multi-level cache hierarchy. Next, the processor may compare the difference between the first cache's hit rate and the second cache's hit rate to first and second thresholds (block 1010). In one embodiment, the first and second thresholds may be programmable.

If the first cache's (FC) hit rate is greater than the second cache's (SC) hit rate by a first threshold (conditional block 1015, "yes" leg), then the processor may increase the size of the first cache and decrease the size of the second cache (block 1020). If the first cache's hit rate is not greater than the second cache's hit rate by the first threshold (conditional block 1015, "no" leg), then the processor may determine if the second cache's hit rate is greater than the first cache's hit rate by a second threshold (conditional block 1025). If the second cache's hit rate is greater than the first cache's hit rate by a second threshold (conditional block 1025, "yes" leg), then the processor may increase the size of the second cache and decrease the size of the first cache (block 1030). If the second cache's hit rate is not greater than the first cache's hit rate by the second threshold (conditional block 1025, "no" leg), then the processor may maintain the current sizes of the first cache and the second cache (block 1035). After blocks 1020, 1030, and 1035, method 1000 may end. In one embodiment, method 1000 may be repeated on a regular basis to determine if the cache sizes should be adjusted based on the difference between the hit rates of the first and second caches.

Figure 11:
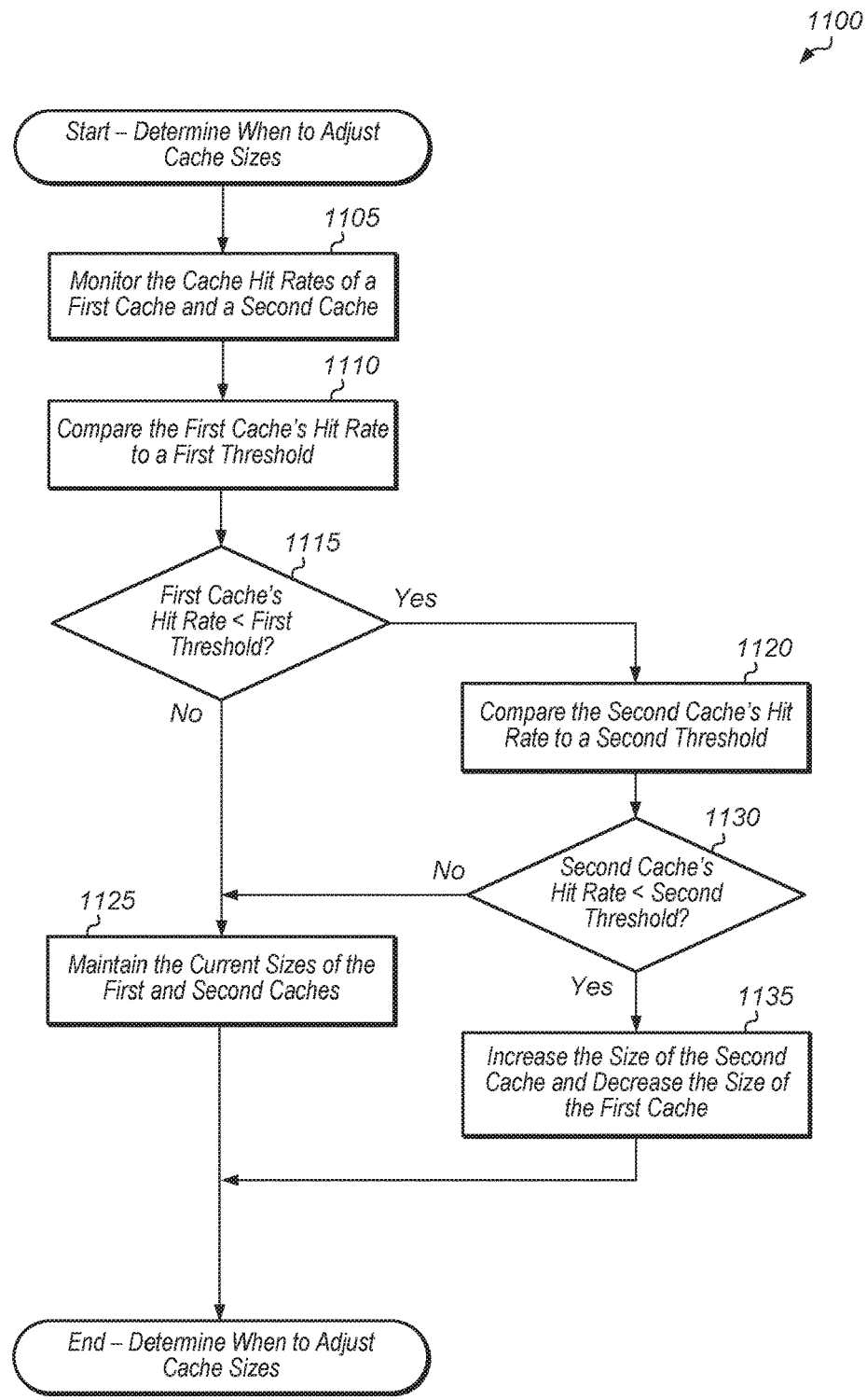
FIG. 11 is a generalized flow diagram illustrating another embodiment of a method for determining when to adjust cache sizes.

Referring now to FIG. 11, another embodiment of a method 1100 for determining when to adjust cache sizes is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 1100.

A processor may monitor the hit rates of a first cache and a second cache (block 1105). It may be assumed for the purposes of this discussion that a single physical cache is logically partitioned into first and second caches. In one embodiment, the first cache may be a L2 cache, and the second cache may be a L3 cache. In other embodiments, the first and second caches may be other cache levels of a multi-level cache hierarchy. Next, the processor may compare the first cache's hit rate to a first threshold (block 1110).

If the first cache's hit rate is less than the first threshold (conditional block 1115, "yes" leg), then the processor may compare the second cache's hit rate to a second threshold (block 1120). In one embodiment, the first and second thresholds may be programmable. If the first cache's hit rate is greater than the first threshold (conditional block 1115, "no" leg), then the processor may maintain the current sizes of the first and second caches (block 1125). In some embodiments, the processor may compare the first cache's hit rate to a plurality of thresholds, with the first threshold being a relatively low threshold. The processor may compare the first cache's hit rate to a relatively high threshold in some scenarios, and the processor may increase the size of the first cache and decrease the size of the second cache in response to the first cache's hit rate exceeding the relatively high threshold. Such an embodiment is described in regard to method 900 of FIG. 9.

If the second cache's hit rate is less than the second threshold (conditional block 1130, "yes" leg), then the processor may increase the size of the second cache and decrease the size of the first cache (block 1135). If both the first and second cache's hit rates are below their corresponding thresholds, this indicates the processor is accessing more data than fits in the second cache, and so in this case, the processor may improve performance by reducing the size of the first cache so as to increase the size of the second cache. If the second cache's hit rate is greater than the second threshold (conditional block 1130, "no" leg), then the processor may maintain the current sizes of the first and second caches (block 1125). After blocks 1125 and 1135, method 1100 may end.

Figure 12:
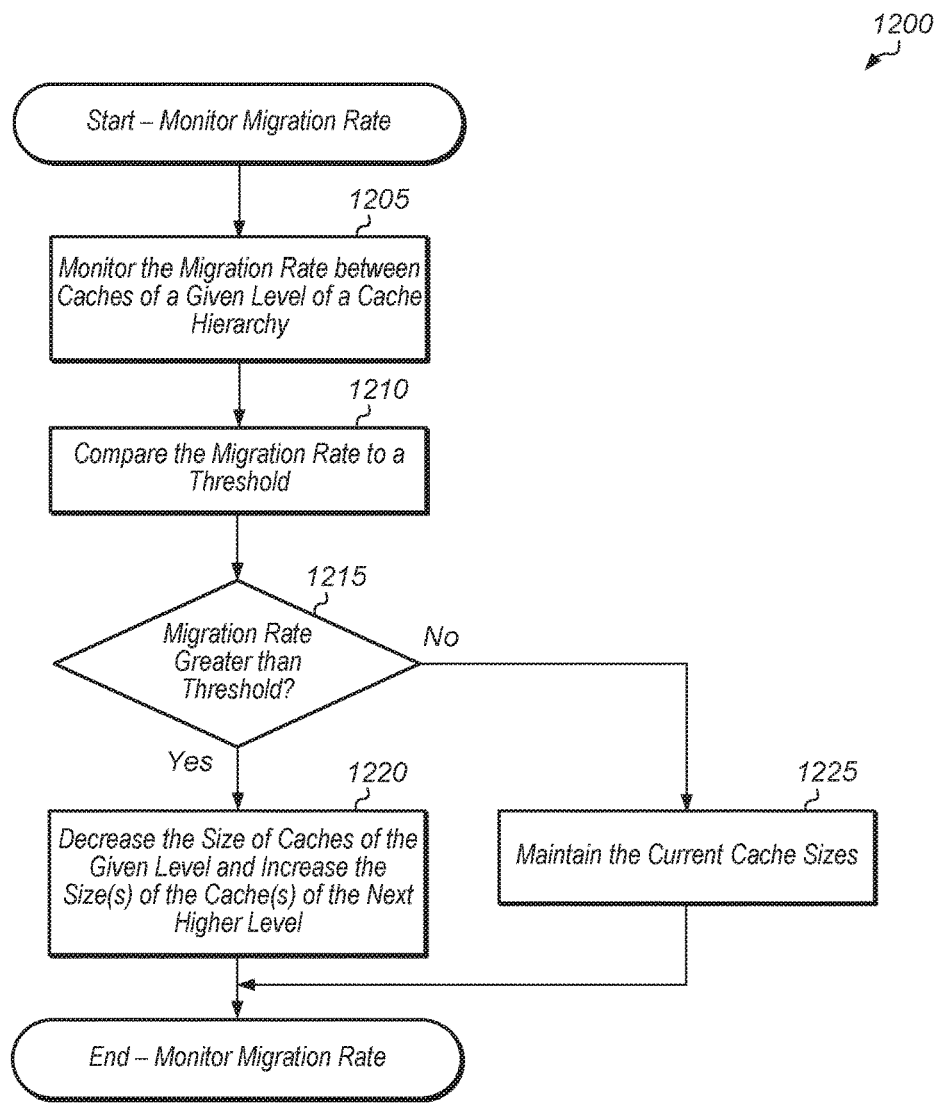
FIG. 12 is a generalized flow diagram illustrating one embodiment of a method for monitoring the migration rate in a cache hierarchy.

Referring now to FIG. 12, one embodiment of a method 1200 for monitoring the migration rate in a cache hierarchy is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 1200.

A multi-core processor with a multi-level cache hierarchy may monitor the migration rate between caches of a given level of the multi-level cache hierarchy (block 1205). In one embodiment, the given level may be the L2 level of the cache hierarchy. Next, the processor may compare the migration rate to a threshold (block 1210). In one embodiment, the threshold may be programmable. If the migration rate is greater than the threshold (conditional block 1215, "yes" leg), then the processor may decrease the size of the caches of the given level and increase the size(s) of the cache(s) of the next higher level of the cache hierarchy (block 1220). In one embodiment, the next higher level may be the L3 level of the cache hierarchy. If the migration rate is less than the threshold (conditional block 1215, "no" leg), then the processor may maintain the current cache sizes of the given level and the next higher level (block 1225). After blocks 1220 and 1225, method 1200 may end.

Figure 13:
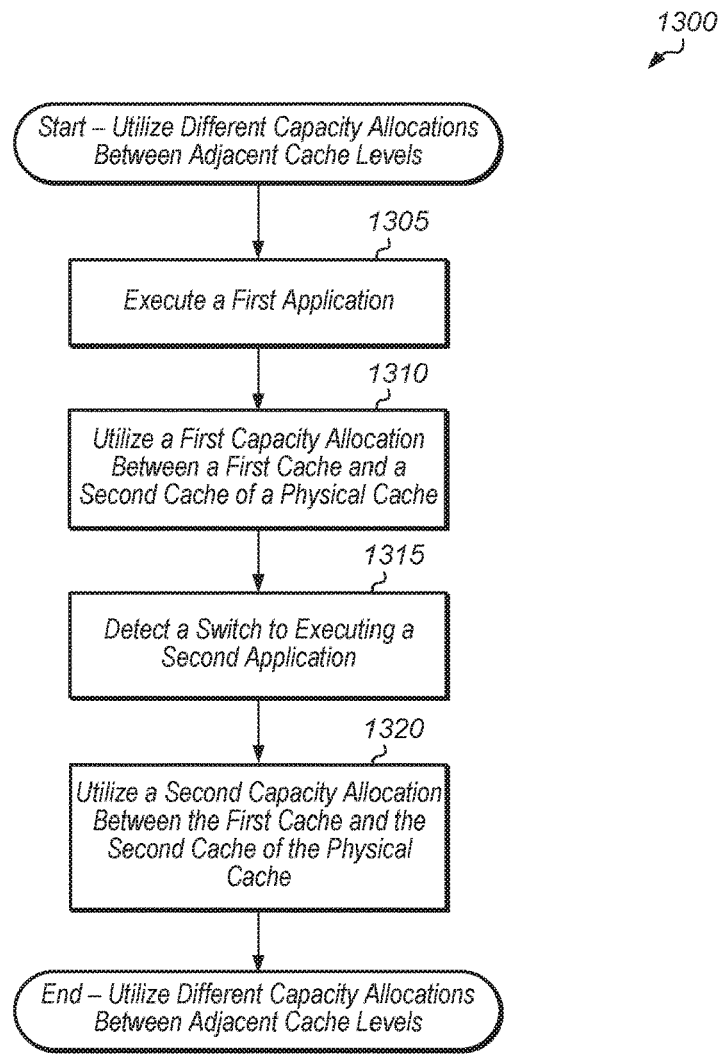
FIG. 13 is a generalized flow diagram illustrating one embodiment of a method for utilizing different capacity allocations between adjacent cache levels.

Referring now to FIG. 13, one embodiment of a method 1300 for utilizing different capacity allocations between adjacent cache levels is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 1300.

A processor with a multi-level cache hierarchy may execute a first application (block 1305). The multi-level cache hierarchy may include a physical cache which includes a first logical cache (or first cache) and a portion of a second logical cache (or second cache). In one embodiment, the first cache may be a L2 cache and the second cache may be a L3 cache. The processor may utilize a first capacity allocation between the first cache and second cache of the physical cache while executing the first application (block 1310). In one embodiment, the first capacity allocation may include a first capacity allocated to the first cache and a second capacity allocated to the second cache, and the first capacity allocation may be the preferred allocation for the first application. The combination (or sum) of the first capacity and the second capacity may be equal to a third capacity, and the third capacity may be fixed for a given physical cache.

Next, the processor may detect a switch to executing a second application (block 1315). In response to detecting the switch to executing the second application, the processor may utilize a second capacity allocation between the first cache and second cache of the physical cache while executing the second application (block 1320). It may be assumed for the purposes of this discussion that the second capacity allocation is the preferred allocation for the second application. It may also be assumed that the second capacity allocation is different from the first capacity allocation, with the second capacity allocation including a fourth capacity allocated to the first cache and a fifth capacity allocated to the second cache. In other words, the fourth capacity is different from the first capacity and the fifth capacity is different from the second capacity. Additionally, the combination of the fourth capacity and the fifth capacity may be equal to the third capacity. After block 1320, method 1300 may end. It is noted that in some cases, when a processor switches between executing different applications, the different applications may have the same preferred capacity allocation for the first and second caches. Accordingly, the processor may not change the capacity allocation when switching between executing different applications if the different applications share the same preferred capacity allocation.

Figure 14:
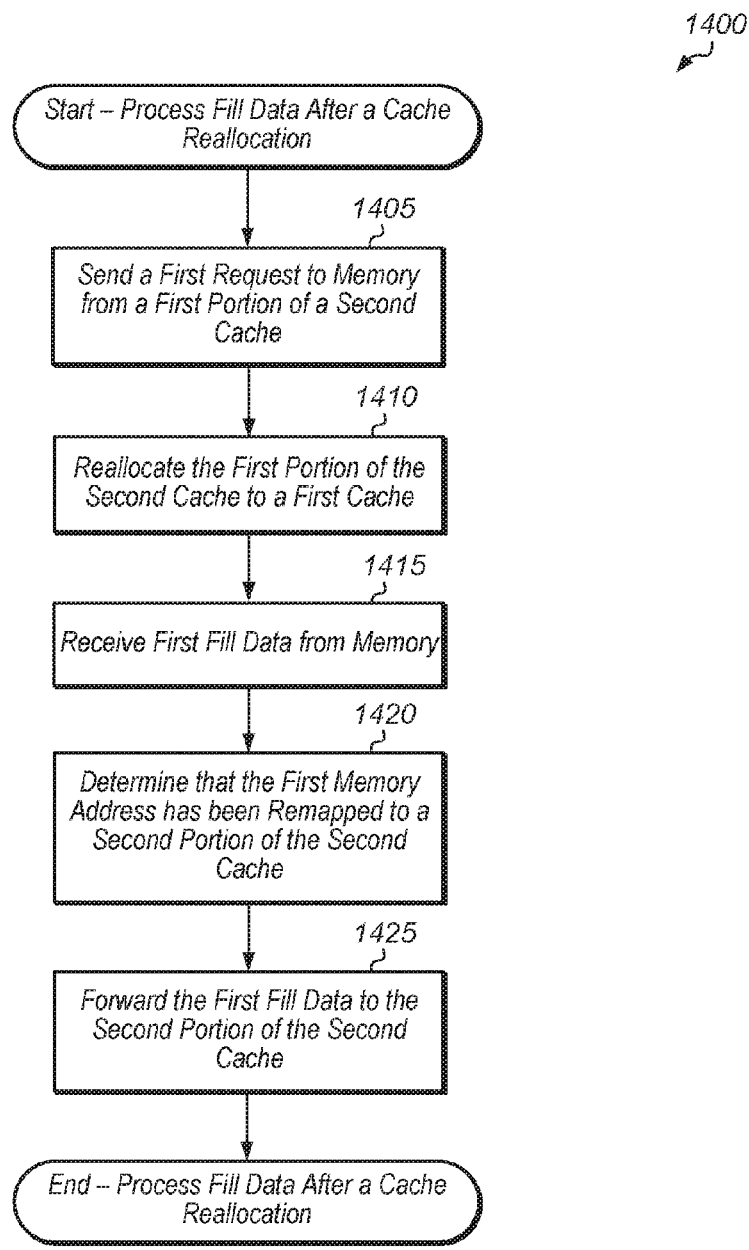
FIG. 14 is a generalized flow diagram illustrating one embodiment of a method for forwarding fill data.

Turning now to FIG. 14, one embodiment of a method 1400 for forwarding fill data is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 1400.

A processor may send a first request to memory from a first portion of a second cache, wherein the first request targets a first memory address (block 1405). In one embodiment, the processor may send the first request to memory in response to the first request missing in the first portion of the second cache. In various embodiments, the first cache may be a logical L2 cache and the second cache may be a logical L3 cache. In other embodiments, the first and second caches may be at other logical levels of a multi-level cache hierarchy.

Next, prior to receiving first fill data which corresponds to the first request from memory, a cache controller may reallocate the first portion of the second cache to the first cache subsequent to sending the first request to memory (block 1410). Then, the cache controller may receive the first fill data from memory (block 1415). The cache controller may determine that the first memory address has been remapped to a second portion of the second cache (block 1420). It may be assumed for the purposes of this discussion that the reallocation of the first portion of the second cache to the first cache caused the first memory address to be remapped to the second portion of the second cache. In response to determining that the first memory address has been remapped to a second portion of the second cache, the cache controller may forward the first fill data to the second portion of the second cache (block 1425). In another embodiment, the cache controller may drop the first fill data rather than forward the first fill data to the second portion of the second cache. After block 1425, method 1400 may end.

Figure 15:
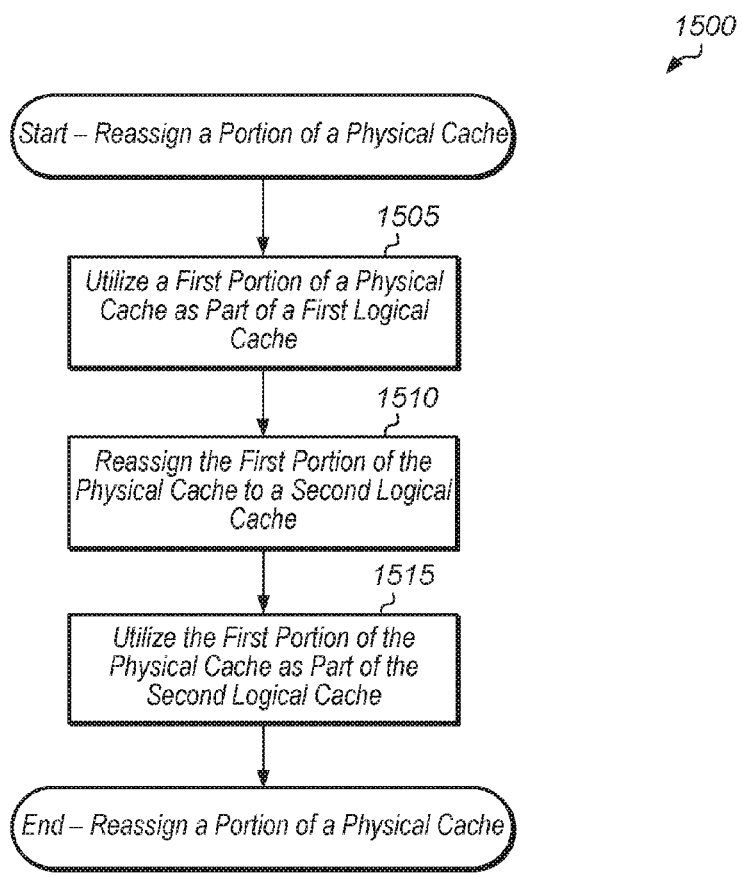
FIG. 15 is a generalized flow diagram illustrating one embodiment of a method for reassigning a portion of a logical cache.

Referring now to FIG. 15, one embodiment of a method 1500 for reassigning a portion of a physical cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems or processors described herein may be configured to implement method 1500.

At a given point of time, a processor may utilize a first portion of a physical cache as part of a first logical cache (block 1505). In one embodiment, the physical cache may include a first logical cache and a second logical cache, with the first logical cache a L2 cache and the second logical cache a L3 cache (or a slice of the L3 cache). Depending on the embodiment, the first portion may be a first way, a first set, a first bank, or another portion of the physical cache. In response to an event or the detection of one or more conditions, the processor may dynamically reassign the first portion of the physical cache to a second logical cache (block 1510). Depending on the embodiment, the event may be switching from a first to a second application, detecting a cache hit rate is above or below a threshold, detecting the difference between cache hit rates is above a threshold, and/or one or more other conditions.

Next, the processor may utilize the first portion of the physical cache as part of the second logical cache (block 1515). For example, the processor may store a cacheline received by the second logical cache in the first portion of the physical cache in block 1515. After block 1515, method 1500 may end. It is noted that the processor may dynamically reallocate capacity between the first and second logical cache many times over a long period of time of operation of the processor, and the first portion of the physical cache may pass back and forth between the first and second logical cache multiple times.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
a first physical cache coupled to a first core;
a second physical cache coupled to a second core; and
a control unit;
wherein the control unit is configured to:
partition the first physical cache into a first logical cache and a first portion of a second logical cache;
partition the second physical cache into a third logical cache and a second portion of the second logical cache, wherein the first and the third logical caches represent a first level of a cache hierarchy, and wherein the second logical cache represents a second level of the cache hierarchy, and wherein each of the first logical cache and second logical cache are configured to store data retrieved from a higher level memory;
reallocate a first way of the second logical cache to the first logical cache;
identify a first cacheline stored in the first way of the second logical cache; and
invalidate the first cacheline responsive to reallocating the first way from the second logical cache to the first logical cache.

2. The processor as recited in claim 1, wherein:
the first logical cache is a private cache of the first core;
the third logical cache is a private cache of the second core; and
the second logical cache is shared by both the first core and the second core.

3. The processor as recited in claim 1, wherein the control unit is further configured to:
perform a lookup in the first logical cache, responsive to receiving a request comprising an address;
in response to determining the request misses in the first logical cache:
perform a lookup in the first portion of the second logical cache, responsive to determining the address selects the first portion of the second logical cache; and
perform a lookup in the second portion of the second logical cache, responsive to determining the address selects the second portion of the second logical cache.

4. The processor as recited in claim 1, wherein the processor is further configured to modify a size of one or more of the first logical cache, the second logical cache, and the third logical cache responsive to one or more of a cache hit rate and a migration rate of cache data between the first logical cache and the third logical cache.

5. The processor as recited in claim 1, wherein the processor is further configured to:
send a first request to memory responsive to detecting a miss on a first memory address targeting an original location in the second logical cache;
reallocate the original location from the second logical cache to the first logical cache subsequent to sending the first request to memory and prior to receiving first fill data from memory, wherein the first fill data corresponds to the first request;
receive the first fill data from memory;
determine that the first memory address has been remapped to a new location in the second logical cache different than the original location in the second logical cache; and
store the first fill data in the new location in the second logical cache.

6. The processor as recited in claim 1, wherein the processor is configured to decrease storage capacity of the first logical cache and increase storage capacity of the second logical cache responsive to switching from executing a first application to executing a second application.

7. A method, comprising:
partitioning a first physical cache coupled to a first core into a first logical cache and a first portion of a second logical cache; and
partitioning a second physical cache coupled to a second core into a third logical cache and a second portion of the second logical cache, wherein the first and the third logical caches represent a first level of a cache hierarchy, wherein the second logical cache represents a second level of the cache hierarchy, and wherein each of the first logical cache and second logical cache are configured to store data retrieved from a higher level memory;
reallocating a first way of the second logical cache to the first logical cache;
identifying a first cacheline stored in the first way of the second logical cache; and
invalidating the first cacheline responsive to reallocating the first way from the second logical cache to the first logical cache.

8. The method as recited in claim 7, wherein:
the first logical cache is a private cache of the first core;
the third logical cache is a private cache of the second core; and
the second logical cache is shared by both the first core and the second core.

9. The method as recited in claim 7, further comprising:
performing a lookup in the first logical cache, responsive to receiving a request comprising an address;
in response to determining the request misses in the first logical cache:
performing a lookup in the first portion of the second logical cache, responsive to determining the address selects the first portion of the second logical cache; and
performing a lookup in the second portion of the second logical cache, responsive to determining the address selects the second portion of the second logical cache.

10. The method as recited in claim 7, further comprising modifying a size of one or more of the first logical cache, the second logical cache, and the third logical cache responsive to one or more of a cache hit rate and a migration rate of cache data between the first logical cache and the third logical cache.

11. The method as recited in claim 7, further comprising:
sending a first request to memory responsive to detecting a miss on a first memory address targeting an original location in the second logical cache
reallocating the original location from the second logical cache to the first logical cache subsequent to sending the first request to memory and prior to receiving first fill data from memory, wherein the first fill data corresponds to the first request;
receiving the first fill data from memory;
determining that the first memory address has been remapped to a new location in the second logical cache different than the original location in the second logical cache; and
storing the first fill data in the new location in the second logical cache.

12. The method as recited in claim 7, further comprising:
decreasing storage capacity of the first logical cache and increasing storage capacity of the second logical cache responsive to switching from executing a first application to executing a second application.

13. A system comprising:
a memory; and
a processor comprising:
a first physical cache coupled to a first core;
a second physical cache coupled to a second core; and
a control unit;
wherein the control unit is configured to:
partition the first physical cache into a first logical cache and a first portion of a second logical cache;
partition a second physical cache coupled to a second core into a third logical cache and a second portion of the second logical cache, wherein the first and the third logical caches represent a first level of a cache hierarchy, and wherein the second logical cache represents a second level of the cache hierarchy, and wherein each of the first logical cache and second logical cache are configured to store data retrieved from the memory;
reallocate a first way of the second logical cache to the first logical cache;
identify a first cacheline stored in the first way of the second logical cache; and
invalidate the first cacheline responsive to reallocating the first way from the second logical cache to the first logical cache.

14. The system as recited in claim 13, wherein:
the first logical caches is a private cache of the first core;
the third logical cache is a private cache of the second core; and
the second logical cache is shared by both the first core and the second core.

15. The system as recited in claim 13, wherein the control unit is further configured to:
perform a lookup in the first logical cache, responsive to receiving a request comprising an address;
in response to determining the request misses in the first logical cache:
perform a lookup in the first portion of the second logical cache, responsive to determining the address selects the first portion of the second logical cache; and
perform a lookup in the second portion of the second logical cache, responsive to determining the address selects the second portion of the second logical cache.

16. The system as recited in claim 13, wherein the processor is further configured to modify a size of one or more of the first logical cache, the second logical cache, and the third logical cache responsive to one or more of a cache hit rate and a migration rate of cache data between the first logical cache and the third logical cache.

17. The system as recited in claim 13, wherein the processor is further configured to:
send a first request to memory responsive to detecting a miss on a first memory address targeting an original location in the second logical cache;
reallocate the original location from the second logical cache to the first logical cache subsequent to sending the first request to memory and prior to receiving first fill data from memory, wherein the first fill data corresponds to the first request;
receive the first fill data from memory;
determine that the first memory address has been remapped to a new location in the second logical cache different than the original location in the second logical cache; and
store the first fill data in the new location in the second logical cache.

18. The system as recited in claim 13, wherein the processor is further configured to decrease storage capacity of the first logical cache and increase storage capacity of the second logical cache responsive to switching from executing a first application to executing a second application.

19. The processor as recited in claim 3, wherein the address comprises:
   one or more bits that identify at least a portion of the first logical cache; and
   one or more bits that identify one of the first portion of the second logical cache and the second portion of the second logical cache.

\* \* \* \* \*